United States Patent Office 3,291,855
Patented Dec. 13, 1966

3,291,855
CATALYTIC DEHYDROGENATION OF PARAFFINIC HYDROCARBONS
Vladimir Haensel, Hinsdale, Ill., assignor to Universal Oil Products Company, Des Plaines, Ill., a corporation of Delaware
No Drawing. Filed Dec. 30, 1965, Ser. No. 517,796
9 Claims. (Cl. 260—683.3)

The present invention relates to a process for effecting the dehydrogenation of saturated hydrocarbons to produce unsaturated hydrocarbons. More specifically, the invention herein described is directed toward a catalytic process for the dehydrogenation of a paraffinic hydrocarbon to the corresponding olefinic hydrocarbon, which process increases the degree and efficiency of conversion, and simultaneously decreases the degree to which undesirable side reactions take place. Through the practice of the present invention, an extended period of operation is afforded during which the catalysts exhibits acceptable stability as a result of decreased carbon deposition thereupon.

The present invention is most advantageously applied in a process for the dehydrogenation of propane, n-butane, isobutane, n-pentane, isopentane and various paraffinic hydrocarbons containing six or more carbon atoms per molecule, all of which may be successfully dehydrogenated to form olefinic hydrocarbons. In many instances, with certain modifications which will become apparent to those having skill in the art of petroleum processing techniques, cycloparaffins may be dehydrogenated to product the corresponding cycloolefins. However, for the sake of brevity, the invention will be described with reference to the dehydrogenation of butanes, and especially the dehydrogenation of isobutane.

The uses of various olefins are numerous, and are applied with success in a wide variety of industries including the petroleum, petrochemical, heavy chemical, pharmaceutical, plastics industry, etc. For example, propylene is utilized in the manufacture of isopropyl alcohol, propylene dimer, trimer and tetramer, cumene, polypropylene, and in the synthesis of isoprene. Butene-1, cis-butene-2, and trans-butene-2 are extensively used in polymer and alkylate gasolines, in the manufacture of polybutenes, butadiene, aldehydes, alcohols, as solvents, cross-linking agents for polymers, and in the synthesis of various $C_4$ and $C_5$ derivatives. Isobutene finds use in the production of isooctane, butyl rubber, polyisobutene resins, tertiary butyl chloride, copolymer resin with butadiene, acrylonitrile, etc. Pentenes are primarily employed in organic synthesis, although alpha-n-amylene (1-pentene) is often used as a component blending agent for high octane motor fuel. These, as well as the many uses of other olefinic hydrocarbons, are well known in the various industries hereinabove set forth.

In order that a dehydrogenation process might achieve commercial success, the use of a suitable dehydrogenation catalyst is required. Strictly thermal conversion of paraffins to the corresponding olefins can be effected provided a sufficiently high temperature is employed. However, due to high temperature pyrolysis, the main reaction is cracking which is undesirable from the standpoint of product quality and yield. At temperatures sufficiently low to avoid the deleterious cracking reactions, little or no conversion to olefins takes place. The use of suitable catalysts avoids this difficulty by permitting relatively low temperature operation for dehydrogenation, while avoiding excessive cracking at higher temperatures. The prior art processes for dehydrogenation are replete with examples of numerous catalysts which can be used in promoting low temperature conversion to olefins. Such catalysts generally consist of one or more metallic components from the metals of Groups VI and VIII of the Periodic Table, and compounds thereof. Such are employed either unsupported, generally in powder or small particle form, or supported or carried by a refractory oxide material. Thus, suitable catalytic composites have been found to comprise one or more components selected from chromium, tungsten, molybdenum, iron, cobalt, nickel, platinum, palladium, iridium, ruthenium, rhodium, osmium, and compounds thereof. These are generally composited with a carrier material comprising one or more inorganic oxides from the group of alumina, silica, zirconia, magnesia, thoria, hafnia, titania, boria, etc. Not withstanding the wide variety of suitable dehydrogenation catalysts, it becomes evident from a perusal of the prior art that any proposed catalyst appears to have inherently one or more drawbacks which detract from the suitability and acceptability thereof. Some are too active, and to the extent that undesirable side reactions are promoted even at low temperatures. Others are too inactive at low temperatures to promote an acceptable degree of dehydrogenation. Still others are insufficiently stable to be effective for an extended period of time, and, as such, do not foster a commercially attractive process.

In conjunction with the various difficulties involved in selecting a suitable catalyst, there is the aspect of equilibrium to consider. Dehydrogenation is generally effected at conditions including a temperature in the range of from 400° C. to about 700° C., a pressure from 0 to 100 pounds per square inch gauge, a liquid hourly space velocity within the range of from about 1.0 to about 10.0, and in the presence of hydrogen in an amount to result in a mol ratio of from 1:0 to about 10:1, based upon the paraffin charge rate. The degree of equilibrium conversion available is directly affected by changes in any one operating variable, and can be controlled to a certain extent by the selective co-action of all the variables. When operating at or extremely close to equilibrium conversion, regardless of the character of the catalyst being used or the degree to which it successfully effects dehydrogenation, various side reactions, including at least some cracking, are also effected. For instance, in the dehydrogenation of isobutane at close to equilibrium, a significant degree of isomerization to n-butane results. This, as well as other side reactions obviously detrimentally affect the efficiency of conversion to isobutylene and tend to adversely affect the economics of the process.

The primary object of the present invention is to provide a paraffin dehydrogenation process which can function at close to equilibrium without suffering from an excessive degree of side reactions leading to decreased efficiency, or cracking which causes the deposition of carbon onto and within the catalyst, thereby shielding the active surfaces and centers thereof from the material being processed.

Therefore, in a broad embodiment, the present invention relates to a process for the dehydrogenation of a paraffinic hydrocarbon, which process comprises contacting said hydrocarbon with a catalytic composite of alumina and at least one metallic component from the metals of Groups VI and VIII of the Periodic Table, and compounds thereof, at dehydrogenating conditions including a temperature within the range of from about 400° C. to about 700° C., and in the presence of sulfur and nitrogen.

This process is further characterized in that a particularly preferred catalyst comprises lithiated alumina containing from about 0.05% to about 5.0% by weight of a Group VIII noble metal, and especially platinum. Although beneficial results are obtained at temperatures from about 400° C. to about 700° C., it is preferable to operate at an intermediate temperature of from about 525° C. to 625° C. The pressure will be in the range of 0 to about 100 p.s.i.g., and most normally at least about 10 p.s.i.g. The pressure will be maintained by compressive hydrogen recycle in an amount such that the mol ratio of hydrogen to hydrocarbon charge is from about 1:1 to about 10:1 the hydrocarbon charge rate being sufficient to give a liquid hourly space velocity (defined as volumes of hydrocarbon charge per volume of catalyst disposed in the reaction zone) of from 1.0 to about 10.0. The combined additive of nitrogen and sulfur is employed such that sulfur is in the greater concentration, and at least twice the amount of the nitrogen. In accordance with the present process, the dehydrogenation is effected in the presence of from 250 to 1,500 p.p.m. of sulfur, and from about 125 to about 375 p.p.m. of nitrogen.

The preferred dehydrogenation catalyst employed in the process of the present invention makes use of a refractory inorganic oxide carrier material with which is combined a Group VIII noble metal component and an alkali metal component. In some instances, the catalyst will contain an alkaline-earth metal component, including calcium, magnesium and/or strontium, although the alkali metals, cesium, rubidium, sodium, and especially lithium are preferred. The Group VIII noble metal, palladium, iridium, ruthenium, rhodium, osmium, and especially platinum, may be present as the element, as a chemical compound, or in physical association with the other catalyst components. In any event, the Group VIII metal will be present in an amount of from about 0.05% to about 5.0%, calculated as if existing as the elemental metal. The alkali metal, or alkaline-earth metal, will be utilized in an amount not generally exceeding 5.0% by weight; in order to achieve a proper balance between inhibiting the occurrence of side reactions, and imparting the desired degree of stability, it is preferred to employ the alkali metal in significantly lower concentrations. Therefore, they will be present in a concentration within the range of from about 0.01% to about 1.5% by weight, calculated as the element thereof. It is preferable to utilize alumina as the carrier material, without the addition thereto of acidic components which tend to promote hydrocracking reactions. The utilization of the other inorganic oxides, in combination with the alumina, is usually dependent upon the desire to impart thereto certain physical and/or chemical characteristics.

The catalyst for use in the present process may be prepared in any suitable manner, and it is understood that the particular method chosen is neither essential to, nor limiting upon the present invention. In general, the alumina carrier material will be prepared and formed into the desired size and shape. The alkali metal, or alkaline-earth metal is added as an aqueous solution thereof, and thus may comprise a chloride, sulfate, nitrate, acetate, etc. Similarly, the platinum component may be composited in any suitable manner, one particularly convenient method involving the use of an impregnating solution of a water-soluble platinum compound. The impregnated carrier is then dried at a temperature of from 100° F. to 300° F., and thereafter subjected to a calcination treatment at an elevated temperature of from 800° F. to about 1100° F.

An essential feature of the present invention involves the simultaneous use of two additives to the dehydrogenation zone, preferably by introducing the same with the paraffinic charge stock. These additives are sulfur and nitrogen, and are utilized in amounts of from about 250 to about 1,500 p.p.m. and from about 125 to about 375 p.p.m., respectively, with the sulfur being present in an amount at least twice that of the nitrogen. The quantities of sulfur and nitrogen are based upon the quantity of hydrocarbon charge, by weight, and regardless of the form in which the additives are introduced, they are calculated on the basis of the element. Sulfur is probably most conveniently added by way of the hydrocarbon charge stock in the form of a sulfurous compound, although hydrogen sulfide may be employed by being admixed with the recycled hydrogen-rich gas stream. Suitable sulfurous compounds include alkyl mercaptans such as tert-butyl mercaptan, hydrogen sulfide, primary, secondary and tertiary alkane thiols and cyclo alkane thiols, desulfides, etc. The precise form, whether as sulfur, or a compound thereof, will be dependent upon the chemical composition of the hydrocarbon charge; thus, where the charge is primarily isobutane, the sulfur additive conveniently is in the form of tert-butyl mercaptan.

The nitrogen additive may also be introduced as a nitrogenous compound to the hydrocarbon charge stock. Suitably convenient compounds include ammonia, hydrazine, nitromethane, primary, secondary and tertiary aliphatic and aryl amines, etc. As with the sulfur, the precise character of the nitrogen will be dependent upon the hydrocarbon charge stock. In order to insure the benefits derived from the combined use of sulfur and nitrogen, it is preferred, with respect to the latter, to employ a halogen-free compound; thus, nitrogenous compounds such as nitrosyl chloride are not applicable for use in the present process.

The addition of the sulfurous compound serves the primary function of inhibiting the degree to which undesirable cracking of the paraffinic hydrocarbon charge takes place. Thus, higher temperatures can be employed for the purpose of increasing the conversion to the desired olefinic hydrocarbons. A consequence of increased temperature to increase conversion is the tendency toward isomerization to other paraffins. Although at identical temperature levels, the use of the sulfurous compound effects a lessening of the degree of isomerization, thereby increasing the efficiency of conversion to olefins, the permitted increase in temperature to increase conversion, also increases the tendency to effect isomerization. However, through the simultaneous addition of the nitrogenous compound, the increased tendency toward isomerization is effectively suppressed. This cojoint action of nitrogen and sulfur is most advantageous in those instances where the product effluent is intended to consist primarily of the paraffin charge and the corresponding olefin. For example, where it is desired to produce isobutylene from a substantially pure isobutane charge, it is undesirable to obtain a product effluent which contains normal butane.

Another advantage of the combined utilization of sulfur and nitrogen resides in the decreased production of di-olefins. The sulfurous compound modifies the ratio of two dehydrogenation steps whereby the primary stage leading to the mono-olefin is enhanced, while the secondary stage resulting in the di-olefin is reduced in intensity. The nitrogenous compound then suppresses the tendency of the olefins to undergo polymerization reactions, the polymer product of which becomes depsited within and throughout the catalytic composite, thereby shielding the active centers and surfaces thereof from the material being processed. Through the increased conversion, the increased efficiency of conversion to the desired olefin, and the increased stability of the catalytic composite, the overall beneficial effect resides in the resulting economic considerations involved in the effective catalyst life and the total quantity of desired olefin produced.

The following examples are presented for the purpose of illustrating the dehydrogenation process hereinbefore described and to indicate the benefits derived through the utilization thereof. It is not intended to limit the scope of the invention, as defined by the appended claims, to the catalyst, operating conditions, concentrations, charge stock, etc., used in these examples. Modification of these variables, within the aforesaid limits, may be made by those skilled in the art of petroleum refining operations, in order to achieve optimum economic advantage in a given situation.

The charge stock employed was commercial grade (99.0%) isobutane; an analysis of this stock indicated an isobutane content of 99.7%, with 0.3% normal butane present. The catalyst was a commercially available alumina composited with 0.75% by weight of platinum and 0.33% by weight of lithium. Analyses on the product gas stream was accomplished by gas chromatography, and the concentrations reported in mol percent. Values for conversion and efficiency were obtained by converting the $C_3$ and lighter components of the hydrocarbon portion to their equivalent $C_4$ values, and adjusting the values to a basis of 100.0%. The conversion of isobutane is difference between the resisual isobutane and 100, and the efficiency is the net isobutylene produced divided by the conversion.

In all the examples which follow, the catalyst was disposed, in an amount of 50 cc., in a stainless steel tube of ⅞-inch nominal inside diameter equipped with a spiral preheater. The operating conditions included temperatures of 550° C. and 575° C. The pressure was maintained at 10 p.s.i.g., the liquid hourly spaced velocity was either 2.0 or 4.0, and hydrogen was introduced with the charge in a mol ratio of either 1:1 or 2:1, with respect to said charge.

*Example I*

In this, as well as the examples following, the test period was of 21 hours duration, with analyses being made during seven one-hour intervals, including the first and twenty-first hours. In a first test period, with neither sulfur nor nitrogen being added to the isobutane charge stock, a temperature of 550° C., 2.0 liquid hourly space velocity, a pressure of 10 p.s.i.g., and a 2:1 hydrogen mol ratio, resulted in a conversion of 20.0% which increased to 20.8% at the end of the 21-hour period. The efficiency of conversion to isobutylene increased from an initial 78.7 to 83.9, the degree of isomerization decreased from 10.3% to 8.0%, the cracking to propane and lighter hydrocarbons decreased from 5.4% to 4.0%, and the catalyst analysis indicated carbon deposition of 0.45% by weight of the total catalyst.

When sulfur was added, without effecting a change in operating variables, by way of tertiary butyl mercaptan, in an amount of 500 p.p.m., the conversion ranged from 21.0% to 19.7%, the efficiency increased from an initial 97.7% to 99.0% at the end of 21 hours, the cracking reactions indicated only 0.5% propane and lighter hydrocarbons, the isomerization to n-butane decreased from 2.7% to 1.3%, and 0.22% by weight of carbon was found to have become deposited on the catalyst.

This example indicates the results obtained through the use of sulfur as an additive; although the isobutane conversion decreased about 1.0%, the efficiency of conversion to isobutylene increased about 18.0%. The degree of cracking to propane and lighter was virtually eliminated, and the isomerization to n-butane was considerably inhibited. Furthermore, the amount of carbon deposited was decreased by about 50.0%.

*Example II*

In this, and the examples following, the values for conversion and efficiency, at the start and termination of the 21-hour test period, will be indicated for simplicity as 00/00, it being understood that the first number is the value during the first hour of the test period, and the second number indicates the value during the twenty-first hour.

Without changing the operating conditions as stated in Example I, the isobutane was processed with 1000 ppm. of sulfur being added as tertiary butyl mercaptan. The conversion of isobutane was 21.2/20.3 mol percent, the efficiency was 99.1/99.0, the degree of isomerization was 2.5/2.2, 0.2 mol percent of propane was produced, and the carbon deposition was 0.60% by weight of the catalyst. When the temperature was increased to 575° C., with 1000 ppm. of sulfur, the conversion was 27.3/26.9, the efficiency of conversion was 97.5/97.5 and 0.7% of propane and lighter hydrocarbons were produced. Thus, the increase in temperature, at the same sulfur addition rate, for the purpose of increasing conversion, is seen to decrease the efficiency by about 1.5%, and to increase slightly the production of propane and lighter hydrocarbons.

*Example III*

For this test period, the temperature was lowered to 550° C., and 250 p.p.m. of nitrogen was added as ammonia, in combination with 1000 p.p.m. of sulfur. Thus, with the exception of the nitrogen additive, the conditions were identical to those of the first portion of Example II. The conversion of isobutane was 23.2/20.1, the efficiency was 99.1/99.0, the degree of isomerization to n-butane (at the termination of the 21-hour period) was 1.0%, 0.2% of propane was produced, and 0.09% carbon was found to have been deposited on the catalyst.

The foregoing specification and examples illustrate clearly the method of the present invention, and the benefits to be afforded through the utilization thereof.

I claim as my invention:

1. A process for dehydrogenating a paraffinic hydrocarbon which comprises contacting said paraffinic hydrocarbon with a catalytic composite of alumina and at least one metallic component selected from the metals of Groups VI and VIII of the Periodic Table, and compounds thereof, at dehydrogenating conditions including a temperature within the range of from about 400° C. to about 700° C., and in the presence of from 500 to 1500 p.p.m. of sulfur and from about 125 to about 375 p.p.m. of nitrogen.

2. The process of claim 1 further characterized in that said catalytic composite comprises platinum.

3. The process of claim 1 further characterized in that said catalytic composite comprises palladium.

4. The process of claim 1 further characterized in that said catalytic composite comprises from about 0.05% to about 5.0% by weight of a Group VIII noble metal, calculated on the basis of the element.

5. The catalytic composite of claim 4 further characterized in that said Group VIII noble metal is combined with alumina and an alkalinous metal component.

6. The process of claim 1 further characterized in that said paraffinic hydrocarbon is isobutane.

7. The process of claim 1 further characterized in that said paraffinic hydrocarbon is normal butane.

8. The process of claim 1 further characterized in that said paraffinic hydrocarbon is propane.

9. The process of claim 1 further characterized in that said paraffinic hydrocarbon is pentane.

References Cited by the Examiner

UNITED STATES PATENTS 3,126,426    3/1964    Turnquest et al. _____ 260—683.3

DELBERT E. GANTZ, *Primary Examiner.*

G. E. SCHMITKONS, *Assistant Examiner.*